United States Patent [19]

Seyler

[11] 3,990,671

[45] Nov. 9, 1976

[54] NON-STRIPPING HOLDER WITH SET SCREW

[76] Inventor: Robert J. Seyler, 8 Pansmith Lane, West Islip, N.Y. 11751

[22] Filed: Oct. 15, 1974

[21] Appl. No.: 515,096

[52] U.S. Cl. ............................ 248/539; 248/188.7
[51] Int. Cl.² ................. A01K 97/10; A45B 25/28
[58] Field of Search ........................... 248/38–44, 248/188.9, 357, 539; 182/107–110; 339/14 R, 14 L, 263 R, 263 E, 263 L, 268 R, 272 R, 272 A

[56] References Cited
UNITED STATES PATENTS

| | | | |
|---|---|---|---|
| 2,596,628 | 5/1952 | Waldinger | 248/43 X |
| 2,613,899 | 10/1952 | Wagner et al. | 248/44 |
| 2,952,432 | 9/1960 | Valdez | 248/42 |
| 3,167,292 | 1/1965 | Meyerowitz | 248/40 X |
| 3,204,898 | 9/1965 | Manning | 248/42 UX |
| 3,843,079 | 10/1974 | Reisling | 248/44 |

FOREIGN PATENTS OR APPLICATIONS

| | | | |
|---|---|---|---|
| 553,137 | 5/1923 | France | 248/38 |
| 630,092 | 12/1961 | Italy | 248/188.9 |
| 210,056 | 8/1940 | Switzerland | 248/42 |

*Primary Examiner*—Lawrence J. Staab
*Attorney, Agent, or Firm*—Browdy and Neimark

[57] ABSTRACT

A holder or socket for retaining a rod or cylinder has a cylindrical ring with a recess therein and a bolt-receiving plate fitting in the recess with a set screw passing through the ring and the plate, threaded through the plate.

6 Claims, 7 Drawing Figures

NON-STRIPPING HOLDER WITH SET SCREW

FIELD OF INVENTION

The invention relates to holders, sleeves or sockets, and more particularly to anchor sockets of the type used to secure the poles of ladders or game structures in a swimming pool.

BACKGROUND OF THE INVENTION

Sockets having a set screw therethrough to lock a post or tube against rotation or slippage, are well known in the art. Particularly, anchor sockets, such as those for swimming pool ladders are known as, for example, the socket disclosed in U.S. Pat. No. 1,611,935. Generally, such sockets are made totally of metal so that the set screw does not strip the hole with repeated usage. Metal, however, is increasingly expensive, particularly rustproof or non-corrosive metals; other metals undesirably corrode. In addition, metal is expensive to fabricate. It has been suggested that such sockets be made of ceramic material or of plastic which are inexpensive, easy to fabricate by molding and non-corrodable, but in such cases the set screw strips the threads after repeated use.

SUMMARY OF THE INVENTION

It is therefore an object of the present invention to overcome the defects of the prior art.

It is another object of the present invention to provide for improved socketing for rods and poles.

It is another object to make a socket, collar or holder out of ceramic, plastic or the like without the set screw stripping its hole with repeated use.

It is another object to provide an improved socket, sleeve or collar for rods, poles and cylinders.

It is a further object of this invention to place an interchangeable bolt-receiving plate in a recess on the interior of a holder.

The present invention achieves these objects by providing an interchangeable bolt-receiving plate in a recess on the interior of the holder or collar, which may be of any cross-sectional shape. The holder or collar may be a sleeve having no base or a socket having a base. In a socket the longitudinal axis may be perpendicular to the plane of the base or tilted from the perpendicular. The sleeve or socket may be made of ceramic or plastic, and the insert of metal so that the non-stripping properties of a threaded hole through metal can be combined with the shaping, weight and corrosion-resistant properties of plastic or ceramic. The result is a structure that can hold a pole against slipping or rotation by tightening a set screw through the bolt-receiving plate.

Other objects of this invention will be made clear from the following detailed description of preferred embodiments, with reference to the drawing wherein:

DESCRIPTION OF THE PREFERRED EMBODIMENTS

In accordance with the present invention, the holder may be made of plastic or ceramic and a metal bolt receiving plate can be inserted in a recess in the holder whereby the set screw passes through a hole in the holder which need not be threaded, and then through a threaded hole in the bolt-receiving plate and then against the pole. The general advantages of a plastic or ceramic holder are thus achieved with the advantage of resistance to thread-stripping of the holder.

Figure 1:
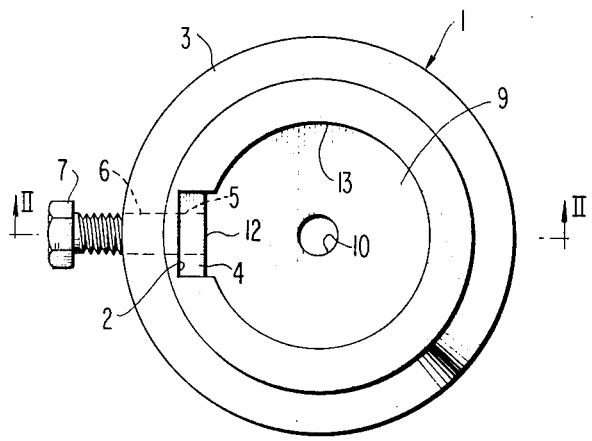
FIG. 1 is a top view of one preferred embodiment.
Figure 2:
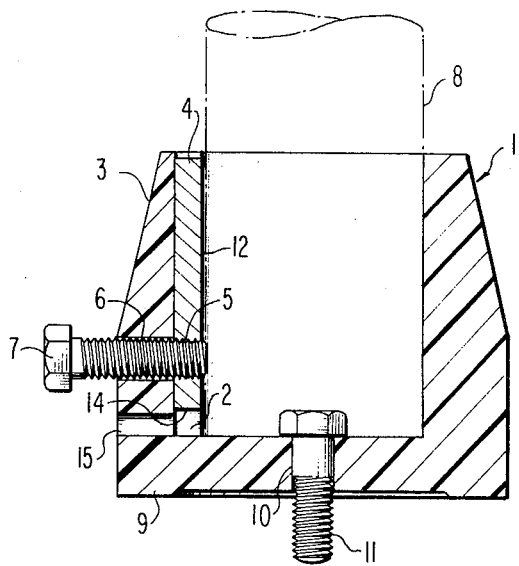
FIG. 2 is a cross-sectional view along the line II—II of FIG. 1.

Referring to the embodiment shown in FIGS. 1 and 2, a cylindrical socket 1 is shown which is preferably made of a ceramic or hard plastic material. The socket 1 has a base 9 and an upwardly extending cylindrical wall portion 3. As shown in FIG. 2, the wall portion 3 is perpendicular to the base 9 of the socket 1. In the base 9 a hole 10 is provided through which a bolt 11 can be utilized to anchor the socket to a floor or other base (not shown) as for example to the bottom or side of a swimming pool.

An axially extending recess 2 is provided in the wall portion 3 on its inner surface, which recess 2 is adapted to retain a bolt-receiving plate 4 having an inner side 12 and a bottom edge 14. The recess 2 may extend from the top of the side wall 3 down to the base 9 thereof; however, the shape of the recess 2 and plate 4 may be of any desired dimensions. An opening 6 extends through the side wall 3 at a convenient height and is aligned with a corresponding opening 5 in the plate 4. A set screw 7 is of such length and dimensions as to extend through both openings 5 and 6 to penetrate into the interior of the socket 1, so that it is capable of impinging directly against a pole 8, shown in phantom in FIG. 2, which is thereby held against rotation or slippage. It is the set screw 7 which presses against the pole and not the plate 4.

The opening 5 through the bolt receiving plate 4 is screw threaded, so that the set screw 7 is held thereby and when turned will move inwardly so as to engage against the pole 8. The plate 4, which is received in the recess 2, is thereby prevented from rotation and remains in its initial vertical position. The plate 4 can have a lesser or greater thickness and/or height than the recess 2, since when the set screw is tightened, the plate 4 will be forced against the wall of the recess 2. The inner side 12 of the plate 4 may extend inwardly beyond the wall 3 of the socket, and further the bottom edge 14 of the plate 4 need not reach the base 9, and this is a convenient place for a hole 15 in the side wall 3, through which water can escape. It should be noted that more than one recess and plate can be provided if desired, and also that more than one set screw 7 can be provided in each plate 4.

Since the plate 4 is made of metal, the set screw 7 can be repeatedly tightened and untightened without stripping the threads in opening 5, while opening 6 can be unthreaded and slightly enlarged if desired. The socket 1 is made of plastic or ceramic material, which are superior to an all-metal socket because plastic can be conveniently molded to the desired size and shape with a uniformly sized recess, and metal bolt-receiving plates can be made and threaded in a single, or a limited number of sizes. No exterior metal surface is presented to corrode, and thus the sockets and sleeves of the present invention need no protective paint coating. Plastic, or similar materials, can more easily be molded into the desired shape and size, and with the use of a metal plate, the antistripping properties of metal can be taken advantage of.

Preferred materials from which to form the socket 1 are thermosetting resins, preferably reinforced, such as fiberglass filled polyesters, epoxies, phenoplasts or aminoplasts; and dimensionally stable and strong thermoplastics such as nylons, polypropylenes, polycarbonates, polyacetals, ABS polymers, and acrylic polymers.

Figure 3:
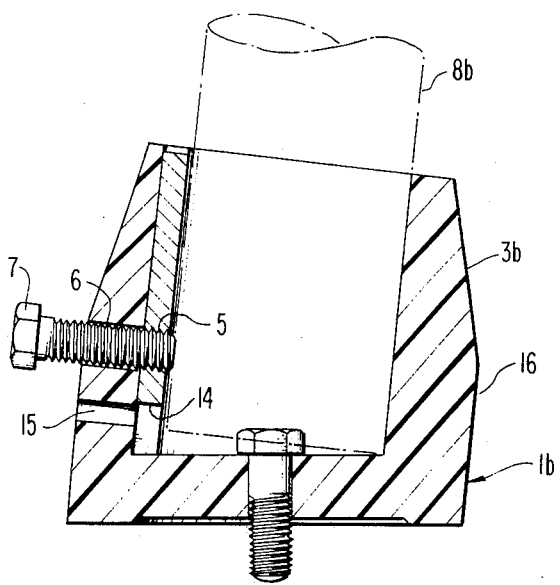
FIG. 3 is a similar view to that of FIG. 2 of a second preferred embodiment.

A modificaton of the invention is shown in FIG. 3 which is similar to FIG. 1 except that the side wall 3b is sloping instead of perpendicular to the base. In this embodiment, the ladder or sliding board post 8b, shown in dotted lines, can be held in a tilted position with respect to the base against rotation or slippage.

Figure 4:
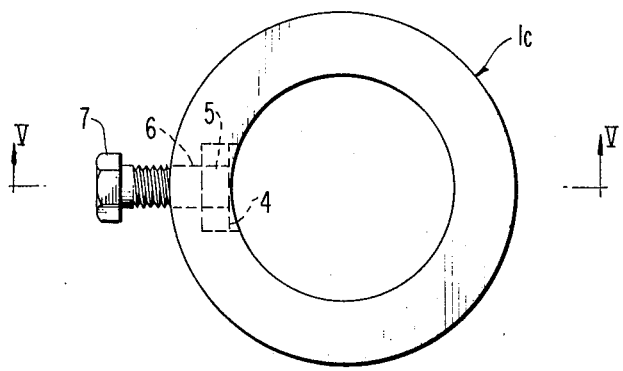
FIG. 4 is a top view of another embodiment.
Figure 5:
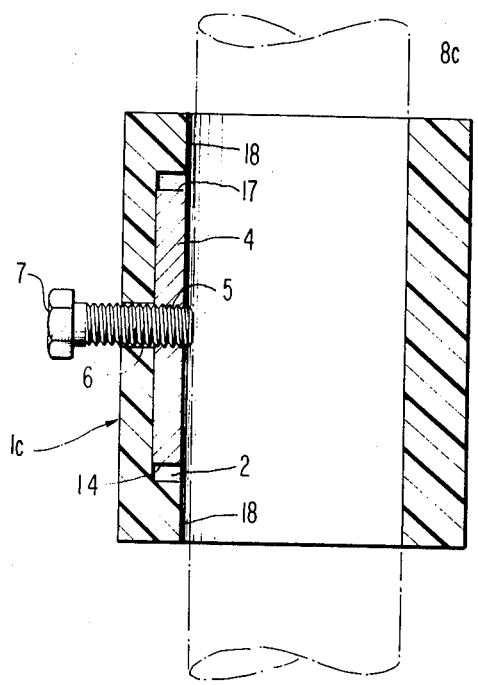
FIG. 5 is a cross-sectional view along the line V—V of FIG. 4.

A further modification of the invention is shown in FIGS. 4 and 5 wherein the holder is in the form of a sleeve which may hold the pole against some other structure (not shown). Again set screw 7 penetrates openings 6 and 5 to impinge against a pole 8c shown in dotted lines to prevent rotation or slippage of the sleeve with respect to the pole. As illustrated, the recess 2 does not extend from the top to bottom of the sleeve but ends so as to leave a rim 18 at top and bottom. The plate 4 is shaped to fit within this recess.

As the sleeve 1c can be made of ceramic or plastic and the plate 4 of metal, set screw 7 can prevent slippage or rotation of the sleeve with respect to the pole after repeated use without stripping the hole in the plate 4.

Figure 6:
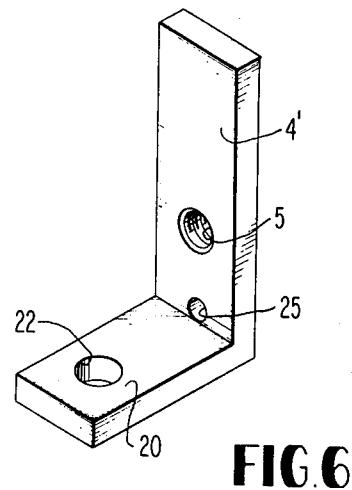
FIG. 6 is a perspective view of a further embodiment of the bolt receiving plate of the present invention.
Figure 7:
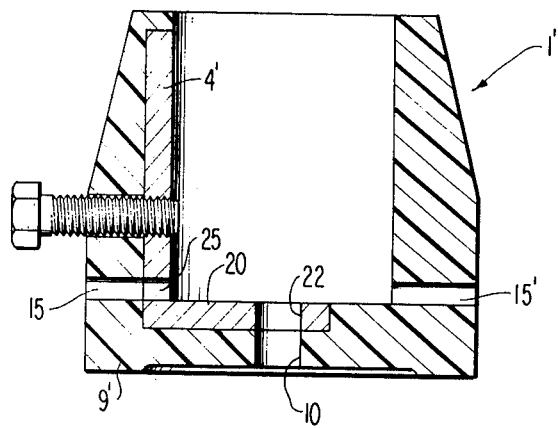
FIG. 7 is a cross sectional view of a socket of the present invention containing the bolt receiving plate shown in FIG. 6.

In a further embodiment of a socket 1' of the present invention as shown in FIGS. 6 and 7, the bolt receiving plate 4' may extend all the way to the bottom 9' of recess 2 and have a radial inward extension 20. The bottom 9' of the socket 2' may have a recess 22 into which lateral extension 20 fits. The lateral extension 20 may have a further opening 22 through which bolt 11 (shown in FIG. 1) extends.

The advantage of this lateral extension 20 is that, as with the case of the bolt receiving plate 4 of the above embodiments providing support for the set screw 7, the lateral extension 20 provides support for the bolt 11 to prevent stripping of the hole or chipping or breaking of the ceramic or plastic material of the socket 1' against which bolt 11 rests. The further opening 22 may be screw-threaded, but in general there is no need for screw-threading the hole 22 since the bolt 11 passes downwardly through the hole 22 and 10 and is then screw-threaded into a base, not shown, external to the socket 1.

A major advantage of the embodiment of FIGS. 6 and 7 is the electrical grounding which is provided through the radial extension 20 between the swimming pool ladder pole and the bolt 10 which contacts the ground. This grounding is required for approval by Underwriters Laboratories.

In addition, since the bolt receiving plate 4' extends to the bottom 9' of the socket 1', a hole 25 may be provided aligned with the hole 15 in order to permit drainage of water. It is also possible, if desired, to place the hole 15 in some other position around the wall portion 3 as shown at 15' in FIG. 7.

It should be understood that in all of the embodiments described, that there can be more than one set screw 7 provided with the additional appropriate threaded opening 5 in the plate 4 and opening 6 in the side wall 3. Further, for certain purposes it may be useful to provide more than one plate 4 with the additional appropriate recesses to receive the additional plates and the additional set screws 7 and openings 6.

It will be obvious to those skilled in the art that various changes may be made without departing from the scope of the invention, for example, the wall portion 3 and/or the socket 1 may be of other than cylindrical shape, such as, rectangular or octangular. The invention is not to be limited to what is shown in the drawings and described in the specification.

What is claimed:

1. A holder comprising:
   a wall portion, having inner and outer sides, said wall portion defining a hollow inner space therein;
   a planar base integral with said wall portion, said base having a hole therethrough and having an upper side facing said inner space;
   a recess on the inner side of said wall portion, said wall portion having at least one hole therethrough opening into said recess;
   a bolt receiving plate, fitted in said recess, having at least one threaded hole therethrough aligned with each said hole through said wall portion and having a lateral extension, said lateral extension abutting said upper side of said planar base and having a hole therein corresponding to said hole through said planar base; and
   a bolt passing through each said hole in said wall portion and said hole in said bolt receiving plate, and sufficiently long to penetrate completely through said bolt receiving plate and into said inner space, said bolt being screw-threaded through said plate;
   said wall portion being formed of plastic and said plate being formed of metal.

2. A holder according to claim 1, wherein said hole through said wall portion is unthreaded.

3. A holder according to claim 1, wherein said hole through said bolt receiving plate is threaded.

4. A holder in accordance with claim 1, wherein said wall portion has a longitudinal axis and said planar base is perpendicular to said longitudinal axis.

5. A holder in accordance with claim 1, wherein the longitudinal axis of said wall portion is tilted with respect to an axis perpendicular to said planar base.

6. A socket in accordance with claim 1 wherein:
   said planar base has a recess in said upper side; and
   said lateral extension fits into said recess.

* * * * *